(12) United States Patent
Chen et al.

(10) Patent No.: US 10,904,910 B2
(45) Date of Patent: Jan. 26, 2021

(54) SYSTEM INFORMATION MODIFICATION AND ACQUISITION PROCEDURE

(71) Applicant: FG Innovation Company Limited, Tuen Mun (HK)

(72) Inventors: Hung-Chen Chen, Hsinchu (TW); Chie-Ming Chou, Hsinchu (TW); Yung-Lan Tseng, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/381,026

(22) Filed: Apr. 11, 2019

(65) Prior Publication Data
US 2019/0320455 A1    Oct. 17, 2019

Related U.S. Application Data

(60) Provisional application No. 62/656,827, filed on Apr. 12, 2018.

(51) Int. Cl.
| | | |
|---|---|---|
| *H04W 72/12* | (2009.01) | |
| *H04W 72/04* | (2009.01) | |
| *H04W 68/02* | (2009.01) | |
| *H04W 4/90* | (2018.01) | |

(52) U.S. Cl.
CPC ....... *H04W 72/1273* (2013.01); *H04W 68/02* (2013.01); *H04W 72/042* (2013.01); *H04W 4/90* (2018.02)

(58) Field of Classification Search
CPC ...... H04W 4/70; H04W 68/02; H04W 72/042
See application file for complete search history.

(56) References Cited

U.S. PATENT DOCUMENTS

| | | | | |
|---|---|---|---|---|
| 10,291,378 B1 * | 5/2019 | Bai | ....................... | H04L 1/0025 |
| 10,574,419 B2 * | 2/2020 | Chatterjee | ............. | H04W 48/12 |

FOREIGN PATENT DOCUMENTS

| | | |
|---|---|---|
| CN | 101646244 A | 2/2010 |
| CN | 102340800 A | 2/2012 |
| CN | 10313885 A | 6/2013 |
| CN | 107465490 A | 12/2017 |
| EP | 2461608 A1 | 6/2012 |

\* cited by examiner

*Primary Examiner* — Chandrahas B Patel
(74) *Attorney, Agent, or Firm* — ScienBiziP, P.C.

(57) ABSTRACT

A method of wireless communications performed by a UE is provided. The method includes: receiving a DCI with a CRC scrambled by a P-RNTI from a base station; checking an SI modification bit in a short message in the DCI when a short message indicator in the DCI indicates that both scheduling information for paging and the short message are present in the DCI; and performing an SI acquisition procedure when the SI modification bit is set in the short message.

20 Claims, 10 Drawing Sheets

600

```
Paging ::= SEQUENCE {
    pagingRecordList  PagingRecordList        OPTIONAL,    -- Need ON
    SIB1Info          OCTET STRING (CONTAINING SytemInformationBlockType1)
                      OPTIONAL,    -- Need ON
}
```

```
Paging ::= SEQUENCE {
    pagingRecordList        PagingRecordList        OPTIONAL,  -- Need ON
}
```

FIG. 4A

```
Paging ::= SEQUENCE {
    pagingRecordList         PagingRecordList         OPTIONAL,   -- Need ON
    systemInfoModification   ENUMERATED {true}        OPTIONAL,   -- Need ON
    etws-Indication          ENUMERATED {true}        OPTIONAL,   -- Need ON
    cmas-Indication          ENUMERATED {true}        OPTIONAL,   -- Need ON
}
```

FIG. 4B

```
Paging ::= SEQUENCE {
    pagingRecordList    PagingRecordList    OPTIONAL,    -- Need ON
    MIBInfo    OCTET STRING (CONTAINING MasterInformationBlock)
               OPTIONAL,    -- Need ON
}
```

FIG. 5

```
Paging ::= SEQUENCE {
    pagingRecordList  PagingRecordList  OPTIONAL,  -- Need ON
    SIB1Info          OCTET STRING (CONTAINING SytemInformationBlockType1)
                      OPTIONAL,  -- Need ON
}
```

FIG. 6

```
Paging ::= SEQUENCE {
    pagingRecordList      PagingRecordList      OPTIONAL,      -- Need ON
    UpdatedSIBInfo        OCTET STRING (CONTAINING Updated SIB(s))
                          OPTIONAL,             -- Need ON
}
```

FIG. 7

```
Paging ::= SEQUENCE {
pagingRecordList  PagingRecordList      OPTIONAL,    -- Need ON
UpdatedSIInfo     CHOICE {
MIBInfo           OCTET STRING (CONTAINING MasterInformationBlock)
SIB1Info          OCTET STRING (CONTAINING SytemInformationBlockType1)
UpdatedSIBInfo    OCTET STRING (CONTAINING Updated SIB(s))
                  OPTIONAL,    -- Need ON
}
}
```

FIG. 8

```
Paging ::= SEQUENCE{
pagingRecordList    PagingRecordList    OPTIONAL,    -- Need ON
MIBInfo    OCTET STRING (CONTAINING MasterInformationBlock)
    OPTIONAL,    -- Need ON
UpdatedSIMessage    ::=SEQUENCE (SIZE (1...maxSI-Message)) of SI-MessageID
}
```

FIG. 9

SYSTEM INFORMATION MODIFICATION AND ACQUISITION PROCEDURE

CROSS-REFERENCE TO RELATED APPLICATION(S)

The present application claims the benefit of and priority to a provisional U.S. Patent Application Ser. No. 62/656,827 filed on Apr. 12, 2018 entitled "Short Message and Paging Message Design for System Information Modification and Acquisition Procedure," (hereinafter referred to as "US73396 application"). The disclosure of the US73396 application is hereby incorporated fully by reference into the present application.

FIELD

The present disclosure generally relates to wireless communication, and more particularly, to system information (SI) modification and acquisition procedure for the next generation wireless communication networks.

BACKGROUND

In Long Term Evolution (LTE), the user equipment (UE) applies the system information (SI) acquisition and change monitoring procedures for the primary cell (PCell). System information may change for certain reasons, but the change of system information occurs at specific radio frames, e.g., a modification period. System information may be transmitted multiple times with the same content within the modification period, as defined by its scheduling. System information change may be indicated to a UE through paging in LTE.

For the next generation wireless communication system (e.g., 5G New Radio (NR)), various efforts have been made to improve different aspects of wireless communications, such as data rate, latency, reliability and mobility. For example, an on-demand SI request procedure and a bandwidth part (BWP) switching operation are introduced in NR. However, how to deal with system information modification in NR is still a challenge. Thus, there is a need for providing an efficient SI modification and acquisition procedure for the next generation wireless communication networks.

SUMMARY

The present disclosure is directed to SI modification and acquisition procedure for the next generation wireless communication networks.

According to an aspect of the present disclosure, a method of wireless communications performed by a UE is provided. The method includes: receiving a DCI with a CRC scrambled by a P-RNTI from a base station; checking a system information (SI) modification bit in a short message in the DCI when a short message indicator in the DCI indicates that both scheduling information for paging and the short message are present in the DCI; and performing an SI acquisition procedure when the SI modification bit is set in the short message.

According to another aspect of the present disclosure, a UE is provided. The UE includes one or more non-transitory computer-readable media having computer-executable instructions embodied thereon and at least one processor coupled to the one or more non-transitory computer-readable media. The at least one processor is configured to execute the computer-executable instructions to: receive a DCI with a CRC scrambled by a P-RNTI from a base station; check a system information (SI) modification bit in a short message in the DCI when a short message indicator in the DCI indicates that both scheduling information for paging and the short message are present in the DCI; and perform an SI acquisition procedure when the SI modification bit is set in the short message.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

FIG. 4A shows one format of a paging message, according to an example implementation of the present application.

FIG. 4B shows another format of a paging message, according to an example implementation of the present application.

FIG. 5 shows another format of a paging message, according to an example implementation of the present application.

FIG. 6 shows another format of a paging message, according to an example implementation of the present application.

FIG. 7 shows another format of a paging message, according to an example implementation of the present application.

FIG. 8 shows another format of a paging message, according to an example implementation of the present application.

FIG. 9 shows another format of a paging message according to an example implementation of the present application.

DETAILED DESCRIPTION

Figure 1:
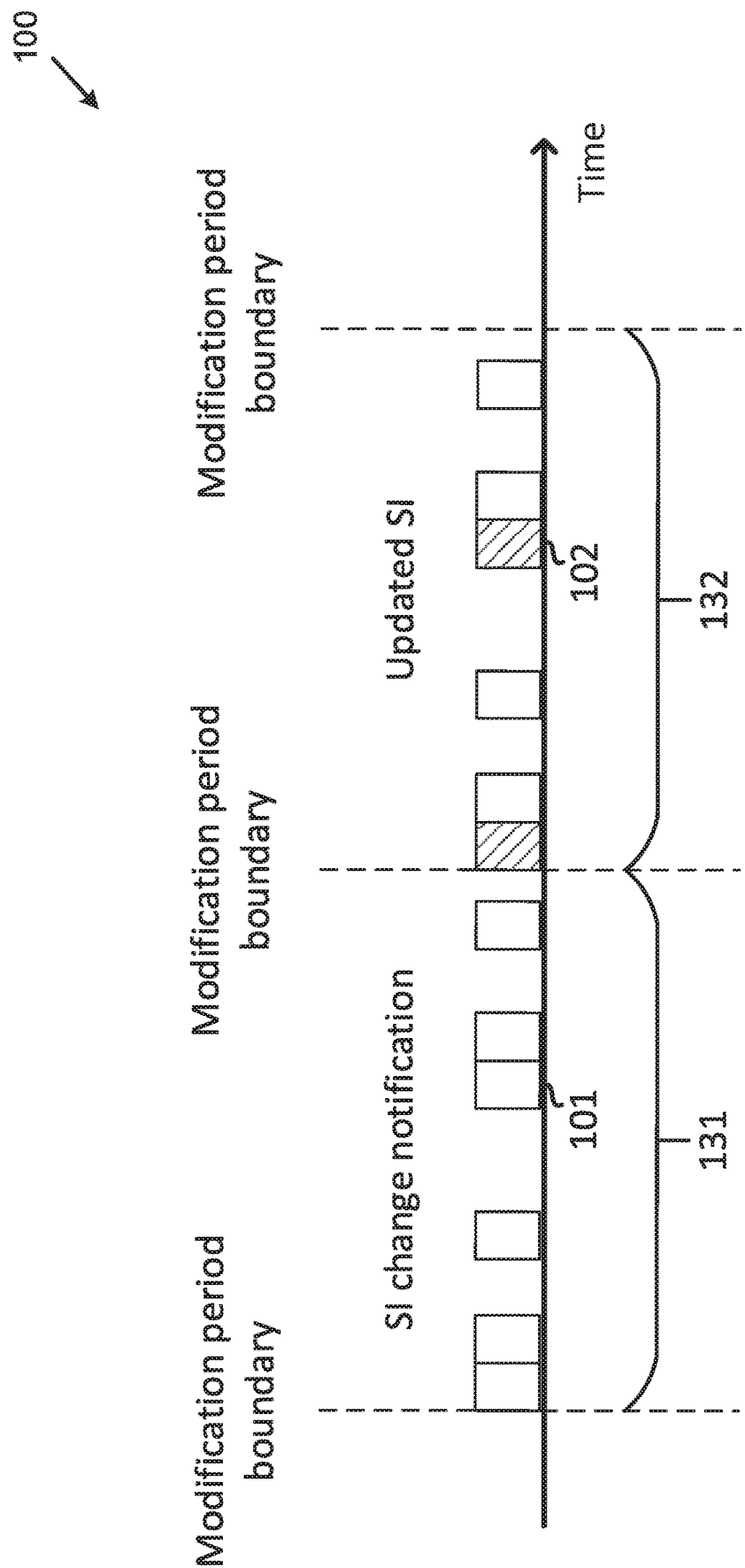
FIG. 1 is a diagram illustrating an example of an SI change notification within a modification period, according to an example implementation of the present application.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus may not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD-ROM), magnetic cassettes, magnetic tape, magnetic disk storage, or any other equivalent medium capable of storing computer-readable instructions.

A radio communication network architecture (e.g., a long term evolution (LTE) system, a LTE-Advanced (LTE-A) system, a LTE-Advanced Pro system, or a 5G New Radio (NR) Radio Access Network) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access network (E-UTRAN), a 5G Core (5GC), or an internet), through a radio access network (RAN) established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GERAN, a ng-eNB as in an E-UTRA base station in connection with the 5GC, a next generation node B (gNB) as in the 5G-RAN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may be also used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in a NR frame to support ProSe services or V2X services.

FIG. 1 is a diagram illustrating an example of an SI change notification within a modification period, according to an example implementation of the present application. As shown in diagram 100, when the network (also referred to as the NW in the following description) changes (some of the) system information, the NW may first notify the UEs about this change in the first modification period 131. In the second modification period 132, the network may transmit the updated system information to the UEs (e.g., the updated system information 102 as compared to the original system information 101). In LTE, system information may be divided into the Master Information Block (MIB) and a number of System Information Blocks (SIBs). The MIB may include a limited number of most essential and most frequently transmitted parameters that are needed to acquire other information from the cell, and may be transmitted on the broadcast channel (BCH), which maps to the physical broadcast channel (PBCH). The SIBs, other than the System Information Block Type1 (SystemInformationBlockType1 or SIB1), may be carried in the System Information (SI) messages, and the mapping of SIBs to SI messages may be flexibly configurable by the Scheduling Information List (schedulingInfoList) included in the SystemInformationBlockType1. For a Connected UE, the UE may acquire at least the MasterinformationBlock (MIB), SystemInformationBlockType1 (SIB1) and System Information Block Type 2 (SystemInformationBlockType2 or SIB2). The SIB1 may contain information relevant to evaluating whether a UE is allowed to access a cell and defining the scheduling of other system information. The SIB2 may contain radio resource configuration information that is common for all of the UEs.

In LTE, a Paging message may be used to inform the UEs in an RRC_IDLE state and the UEs in an RRC_CONNECTED state of a system information change. If the UE receives a Paging message including the System Information Modification (systemInfoModification) field, the UE may determine that the system information will change within the next modification period. Then the UE may perform a system information acquisition procedure to update the changed system information. Although the UE may be informed about changes in the system information and no further details (e.g. regarding which system information will change) may be provided. After receiving the Paging message including the systemInfoModification field, the UE may acquire the new system information immediately from the start of the next modification period.

On the other hand, if the UE receives a Paging message including the etws-Indication or cmas-Indication, the UE may start receiving the Earthquake and Tsunami Warning System (ETWS) or Commercial Mobile Alert System (CMAS) notification(s) based on the previously acquired schedulingInfoList until the UE re-acquires the schedulingInfoList in the SystemInformationBlockType1. The Paging message may trigger the UE to re-acquire the schedulingInfoList contained in the SystemInformationBlockType1 for scheduling changes for the SIBs associated with the corresponding ETWS or CAMS notifications. Once the SIBs associated with the corresponding ETWS or CAMS notifications are no longer scheduled, the UE may stop receiving the SIBs.

In New Radio (NR), the System Information (SI) may be divided into the Minimum SI and Other SI. The Minimum SI may be periodically broadcasted and may include basic information required for initial access and information (e.g., scheduling information) for acquiring any other SI broadcasted periodically or provided on-demand. The Other SI may encompass everything not broadcasted in the Minimum SI and may be either broadcasted or provided in a dedicated manner. The Other SI may be broadcasted at a configurable periodicity and for a certain duration. The network may decide whether the other SI is broadcasted or delivered through dedicated and UE specific RRC signaling. When the UE obtains information that there is system information modification, the UE may acquire the updated SI (except for ETWS or CMAS notification) in the next modification period. As for ETWS or CMAS indication, the UE may acquire the ETWS or CMAS notification immediately.

Minimum SI may be divided into two parts. The first part of Minimum SI (which may be called NR Master Information Block or NR MIB) may be transmitted via the PBCH. The NR MIB may contain at least information about the System Frame Number (SFN), scheduling of the second part of Minimum SI (which may be called Remaining Minimum SI or RMSI), "cellBarred" IE (indicating that the UE cannot camp on the cell), and "intraFreqReselection" IE (indicating whether the UE excludes the cells on the same frequency as a candidate for a cell selection/reselection procedure for a certain time period or not when the cell status is indicated as "barred"). The RMSI may contain at least the common RACH configuration and the scheduling information of each SI message that includes a set of SI blocks. The RMSI may be called NR System Information Block Type 1 or NR SIB1.

In one implementation, the NR-PBCH may have a payload size of 56 bits (including CRC). 10-bit SFN may be carried by the NR-PBCH. A single bit may be used in the NR-PBCH for indicating the numerology of the RMSI, Msg.2/4 for initial access and broadcasted Other System Information (OSI). The bandwidth for the RMSI and the CORESET containing the PDCCH scheduling RMSI may support at least the same bandwidth as the SS/PBCH. The initial active DL bandwidth part (BWP) may be defined as a frequency location and the bandwidth of the RMSI CORESET and the numerology of the RMSI. The Physical Downlink Shared Channel (PDSCH) delivering the RMSI may be confined within the initial active DL BWP. The following parameters for the broadcasted OSI CORESET may be explicitly signaled in the corresponding RMSI: the SI window configuration, e.g., time offset, duration, and periodicity. The following parameters for the broadcasted OSI CORESET may be the same as those for the corresponding RMSI CORESET: frequency location, bandwidth, and numerology. For the connected state UEs, the non-broadcast on-demand (e.g. dedicated) OSI transmission may be up to a gNB scheduling (e.g., no specific handling for non-broadcast on-demand OSI CORESET).

Moreover, for power saving, the concept of bandwidth part (BWP) is introduced in NR. Using the concept of BWP, a UE may not need to monitor the whole bandwidth of a wideband carrier (e.g., New Radio-Absolute Radio Frequency Channel Number (NR-ARFCN)). For each UE-specific serving cell, one or more DL BWPs and one or more UL BWPs may be configured via dedicated RRC signaling. For a UE, there may be at most one active DL BWP and at most one active UL BWP at a given time for a serving cell. For switching among the different BWPs of a serving cell, a single scheduling downlink control information (DCI) may be used to switch the UE's active BWP from one BWP to another (of the same link direction). Furthermore, a timer based solution may be used to switch an active DL BWP to a default BWP. Specifically, a timer (e.g., BWP inactivity timer) may be used to switch an active BWP to a default BWP after a certain inactive time period.

Furthermore, in NR, the concept of on-demand SI request procedure is also introduced. For a UE in an IDLE state or an Inactive state, when the UE finds that, based on the information included in the NR SIB1 (e.g., a one-bit indicator to show whether the corresponding SI message is currently broadcasted or not) and the mapping of SIBs to SI messages, the required SIB(s) is not broadcasted, the UE may perform an on-demand SI request procedure to ask the network (NW) to broadcast the required SIB(s) or SI message(s).

In some of the present embodiments, an SI change/update may be indicated to the UEs through paging. An RRC_IDLE, or an RRC_INACTIVE, UE may monitor the SI change indication in its own paging occasion (e.g., in every Discontinuous Reception (DRX) cycle). On the other hand, an RRC_CONNECTED UE may monitor the SI change indication in any paging occasion (e.g., if the UE is provided with common search space on the active BWP to monitor the paging in a connected state). If the UE receives the SI change indication, the UE may acquire the updated SI at the next modification period boundary, assuming that the NW broadcasts the updated SI (even if the updated SI is an on-demand SI). It should be noted that in this disclosure the terms "SI change", "SI modification", and "SI update" may be used interchangeably. The SI change indication (or the SI modification indication, or the SI update modification) may indicate whether the system information is modified. It should also be noted that, the term "the common search space to monitor paging" may also be referred to as "the paging search space" in the following description.

In one implementation, the SI change indication may be included in a paging message. In one implementation, the SI change indication may be included in a DCI, which is transmitted with a cyclic redundancy check (CRC) scrambled by a Paging-Radio Network Temporary Identifier (P-RNTI). In one implementation, the SI change indication may be an SI modification bit. The DCI transmitted with the CRC scrambled by the P-RNTI may include a short message, which may include the SI modification bit. In one implementation, the DCI may be transmitted by means of the DCI format 1_0 with a CRC scramble by a P-RNTI. The DCI may include a short message, which may include the SI modification bit.

If the broadcasted SI is provided within the UE's active BWP, the UE may acquire the broadcasted SI required for a connected state from the UE's active BWP. The NW may not configure the common search space for the NR SIB1 and the OSIs in each UE-specific active BWP due to significant radio resources consumption, especially if the SI is not allowed to be broadcasted in the UE's active BWP with the numerology different from the numerology of the initial BWP. Using dedicated signaling for delivering the updated SIs may suffer from the same problems of the resource wasting and numerology inconsistency. Moreover, switching the UE to another BWP for the SI acquisition may have impact on maintenance of the quality of ongoing services. On the other hand, using the radio resource for broadcasting the SI messages in different BWPs may be inefficient.

In some of the present embodiments, paging messages may be used for notifying the SI modification, or a public warning system notification indication (e.g., ETWS or CMAS) for the UEs in an IDLE/Inactive state, the UEs in a Connected state. However, the required SIB(s) for the IDLE/Inactive UEs and the Connected UEs may be different. It may be beneficial to notify whether the updated SI(s) is required for an IDLE UE, an Inactive UE, a Connected UE, or all three states of the UE to reduce the number of unnecessary SI acquisition procedures.

As described above, in NR, an IDLE/Inactive UE may monitor the system information and the paging information in the initial DL BWP. On the other hand, UEs in a connected state may monitor the paging information in the paging search space in the active DL BWP, based on the assumption that the paging search space is provided in every DL BWP.

When a UE receives a DCI which is transmitted with a CRC scrambled by the P-RNTI from a base station, the UE may check the Short Message Indicator in the DCI. In one implementation, the Short Message Indicator may be one-bit information. This bit may be used to indicate whether the short message only, or scheduling information only, is carried in the DCI.

For example, in some aspects of the present embodiments, if the one bit indicator is 0, the short message indicator may indicate that this is a special DCI carrying a short message without the associated PDSCH. The UE may check the information carried in the corresponding short message in this special DCI to perform the related actions. In some such embodiments, if the one bit indicator is 1, the short message indicator may indicate that it is a normal DCI carrying the control information to schedule the associated PDSCH. The UE may receive the related paging message based on the scheduled PDSCH. It should be noted that the example given here is just exemplary rather than limiting. The short message indicator may include more than one bits in other implementations.

In one implementation, the short message indicator may indicate whether the short message is in the DCI. The short message indicator may also indicate whether the scheduling information for paging is in the DCI. For example, if the scheduling information for paging is in the DCI, the DCI may carry the control information to schedule the associated PDSCH, and the UE may receive the related paging message based on the scheduled PDSCH. If only the short message is present in the DCI, the DCI may carry the short message without the associated PDSCH. It is also possible that both the scheduling information for paging and the short message are present in the DCI.

In one implementation, the short message may include an information bit representing the "SI Modification Indication" (this information bit may also be referred to as the SI modification bit in the following description). The SI modification bit may indicate whether the system information is modified. If the SI modification bit is set (e.g. the bit's value is set to 1), the UE may perform an SI acquisition procedure to obtain the updated SI. In one implementation, the information bit representing the "SI Modification Indication" may only be carried in the short message and no information bit representing the "SI Modification Indication" may be carried in the paging message.

If both the scheduling information for paging and the short message are present in the DCI, the short message and the paging message may both be used in some of the present embodiments. In one implementation, the information bit representing the "SI Modification Indication" may be carried in the short message, whereas the SI modification information (e.g., the MIB or the MIB related content, the SIB1 or the SIB1 related content, or the updated SIB(s)) may be carried in the paging message based on the scheduled PDSCH.

In one implementation, the short message may include at least the related bits for the SI Modification Indication and the Public Warning System (PWS) Notification Indication. For the PWS Notification Indication, there may be one information bit for the ETWS and one information bit for the CMAS in one implementation. In another implementation, the short message may include one information bit for the PWS Notification Indication. This single PWS notification bit may be used for both of the ETWS notification and the CMAS notification. The short message may also include some other information bits.

Different implementations regarding the short message are described below.

Case 1-1: In some of the present embodiments, a short message may include a field (which may include one or more bits) indicating whether the UE in different RRC states may perform the SI acquisition procedure if the SI modification bit in the short message is set. For example, the short message may include one or more information bits to indicate whether the SI modification is required for a Connected UE, for an IDLE/Inactive UE, or for both Connected UE and IDLE/Inactive UE.

In Case 1-1, in the short message, there are two information bits (e.g., a "Required for Connected Indication" bit and a "Required for IDLE/Inactive Indication" bit) to indicate whether the SI modification is required for a Connected UE or for an IDLE/Inactive UE.

Table 1 below shows an exemplary implementation for the short message's bits and the corresponding information. Bit 1 in Table 1 is the SI modification bit. In some aspect of the present embodiments, one or more SIBs related to cell re-selection configurations/parameters, or the on-demand SIB(s), may only be required for an IDLE/Inactive UE (e.g., the access control configurations/parameters related to the IDLE/Inactive state). In some aspect of the present embodiments, one or more SIBs related to configurations/parameters of different service types, or the access control configurations/parameters related to the connected state, may only be required for a Connected UE. In some aspect of the present embodiments, one or more SIBs which may include the common Random Access (RA) configurations/parameters and the SI scheduling information (e.g., NR SIB 1) may be required for the UEs in all three states. Since a UE may not need to perform the SI acquisition procedure for the unrequired SI, the short message may include the information bit(s) to indicate whether the SI modification is required for a Connected UE only, for an IDLE/Inactive UE only, or for all different UE's states, so that the UE may not need to perform the unnecessary SI acquisition procedure(s).

TABLE 1

Short Message Information Example for Case 1-1

| Bit | Information Description |
|-----|------------------------|
| 1 | SI Modification Indication |
| 2 | Required for Connected Indication |
| 3 | Required for IDLE/Inactive Indication |
| 4 | PWS Notification Indication |
| 5-8 | Not Used, and may be ignored by UE |

It should be noted that in case of transition from a connected state to an IDLE/Inactive state, the UE may need to perform the SI acquisition procedure to acquire the SIB(s) required for the IDLE/Inactive state. If the required SIB(s) for IDLE/Inactive state is not broadcasted, the UE may perform the SI request procedure to ask the NW to broadcast the required SIB(s) for the IDLE/Inactive state. Alternatively, the NW may provide the latest required SIB(s) for the IDLE/Inactive state to the UE via RRC signaling (e.g., an RRC Connection Release message) which may be used to command the UE to enter the IDLE or Inactive state. When the UE receives the latest required SIB(s) for the IDLE/Inactive state (e.g., via RRC signaling) which is used to command the UE to enter the IDLE or Inactive state, the UE may need not perform the SI acquisition procedure or the SI request procedure.

When a UE receives a DCI with a CRC scrambled by a P-RNTI (this DCI may also be referred to as a paging DCI in the following description), the UE may check the Short Message Indicator in the DCI. If the short message indicator indicates that a short message is not present in the DCI, the UE may know that the paging is not for informing the UE of an SI Modification. If the short message indicator indicates that a short message is present in the DCI, the UE may know that the paging is for informing the UE of an SI Modification. For example, the DCI may be a special DCI carrying a short message without associated PDSCH (or a DCI carrying a short message with associated PDSCH). Then the UE may further check information bits in the short message that represent the "Required for Connected Indication" and the "Required for IDLE/Inactive Indication."

In some aspects of the present embodiments, if the bit representing the "Required for Connected Indication" is set to a particular value (e.g., 1) to inform the UE that the updated SIB(s) is required for a Connected UE, a UE in connected state may perform the SI acquisition procedure to acquire the updated SIB(s). It should be noted that to perform the SI acquisition procedure, the UE may first read the MIB on the current active BWP, if provided. Alternatively, the UE may use the valid MIB information which is already stored by the UE before receiving the paging DCI. The UE may then read the SIB1 for updating the SIB1 content and get the scheduling information for the other SIB(s) followed by the MIB information. If the UE receives an SI change indication in the paging DCI, the UE may acquire the updated SI at the next modification period boundary, assuming that the NW broadcasts the updated SI.

In some aspects of the present embodiments if the bit representing the "Required for IDLE/Inactive Indication" is set to a particular value (e.g. 1) to inform the UE that the updated SIB(s) is required for an IDLE/Inactive UE, a UE in the IDLE/Inactive state may perform the SI acquisition procedure to acquire the updated SIB(s).

In one implementation, the information bit for the SI Modification Indication may be removed since the UE may check the information bit for the "Required for Connected Indication" and the "Required for IDLE/Inactive Indication" to confirm whether there is any SI modification at the next modification period boundary.

In one implementation, in the short message, there are three information bits (e.g., "Required for Connected Indication", "Required for Inactive Indication" and "Required for IDLE Indication" bits) to indicate whether the SI modification is required for a Connected UE, an Inactive UE, and an IDLE UE, respectively. An example of this implementation is shown in Table 2. Bit 1 in Table 2 is the SI modification bit.

TABLE 2

Short Message Information Example

| Bit | Information Description |
|---|---|
| 1 | SI Modification Indication |
| 2 | Required for Connected Indication |
| 3 | Required for Inactive Indication |
| 4 | Required for IDLE Indication |
| 5 | PWS Notification Indication |
| 6-8 | Not Used, and may be ignored by UE |

In one implementation, the information bit for the SI Modification Indication may be removed since the UE may check the information bit for the "Required for Connected Indication" and the "Required for Inactive Indication" and the "Required for IDLE Indication" to confirm whether there is any SI modification at the next modification period boundary.

In one implementation, the NW may use the same P-RNTI (with a fixed value) to scramble the paging DCI for a Connected UE, an Inactive UE, and an IDLE UE.

In one implementation, the NW may use different P-RNTIs to scramble the paging DCI for the Connected UE, the Inactive UE and the IDLE UE, respectively. For example, a value of the P-RNTI may be preconfigured for an RRC state. Therefore, a Connected UE may only receive the paging DCI dedicated to the Connected UE, an Inactive UE may only receive the paging DCI dedicated to the Inactive UE, and an IDLE UE may only receive the paging DCI dedicated to the IDLE UE. Having the different P-RNTIs, some of the present embodiments may remove the information bit(s) that indicate whether an SI modification for a Connected UE, an Inactive UE, and/or an Inactive UE is required.

In one implementation, the NW may use the same P-RNTI for two different RRC states and a different RNTI for the third RRC state. For example, the NW may use different P-RNTIs to scramble the paging DCI for a Connected UE and an IDLE/Inactive UE, respectively. Therefore, the Connected UE may only receive the paging DCI dedicated to the Connected UE only. Similarly, an IDLE/Inactive UE may only receive the paging DCI dedicated to the IDLE/Inactive UE only. Having the different P-RNTIs, some of the present embodiments may remove the information bit(s) that indicate the requirement of an SI modification for a Connected UE or for an IDLE/Inactive UE.

Case 1-2: In some of the present embodiments, the bits for the SI Modification Indication and the PWS Notification Indication may be integrated. For example, if the integrated bit is "0", the UE may know that the paging message is for informing the UE of an SI Modification. On the contrary, if the integrated bit is "1", the UE may know that the paging message is for informing the UE of a PWS information broadcasting. An example of Case 1-2 is shown in Table 3 below. Bit 1 in Table 3 is the SI modification bit.

TABLE 3

Short Message Information Example for Case 1-2

| Bit | Information Description |
|---|---|
| 1 | For SI Modification Indication or for PWS Notification Indication<br>0: the paging is for indicating the SI Modification<br>1: the paging is for indicating the PWS broadcasting |
| 2-8 | Not Used, and may be ignored by UE |

Case 1-3: In some of the present embodiments, two information bits for the "SI Modification Indication" may be used to indicate whether the paging is for indicating the SI Modification, and which kind of UE (e.g., the UEs in what states) needs to perform the SI Acquisition procedure for this SI Modification. An example of Case 1-3 is shown below in Table 4.

In some aspects of the present embodiments, when a UE receives a DCI with a CRC scrambled by a P-RNTI, the UE may check the Short Message Indicator. If the short message indicator indicates that this is a special DCI carrying a short message, the UE may check information in the corresponding short message. In one implementation, the short message may include two bits for the "SI Modification Indication." If the bits representing the "SI Modification Indication" are "00", the UE may know that the paging is not for informing the UE of an SI Modification, but for a PWS broadcasting notification. If the bits representing the "SI Modification Indication" are "01", the UE may know that the paging is for informing the UE of an SI Modification and the updated SIB(s) is required for a Connected UE. If the bits representing the "SI Modification Indication" are "10", the UE may know that the paging is for informing the UE of an SI Modification and the updated SIB(s) is required for an IDLE/Inactive UE. If the bits representing the "SI Modification Indication" are "11", the UE may know that the paging is for informing the UE of an SI Modification and the updated SIB(s) is required for both the Connected UE and the IDLE/Inactive UE.

TABLE 4

Short Message Information Example for Case 1-3

| Bit | Information Description |
|---|---|
| 1-2 | For SI Modification Indication or for PWS Notification Indication<br>00: informing the PWS broadcasting<br>01: indicating the SI Modification for Connected UE<br>10: indicating the SI Modification for IDLE/Inactive UE<br>11: indicating the SI Modification for both Connected UE and IDLE/Inactive UE |
| 3-8 | Not Used, and may be ignored by UE |

Case 1-4: In some aspects of the present embodiments, one information bit for the "SI Modification Indication" may indicate whether the paging is for informing the UE of an SI Modification. One information bit for the "Required for IDLE/Inactive Indication" may indicate whether only an IDLE/Inactive UE needs to perform the SI Acquisition procedure for this SI Modification. In Case 1-4, only on-demand SIB(s) are required for an IDLE/Inactive UE. An example of this Case 1-4 is shown below in Table 5. Bit 1 in Table 5 is the SI modification bit.

TABLE 5

Short Message Information Example for Case 1-4

| Bit | Information Description |
|---|---|
| 1 | SI Modification Indication |
| 2 | Required for IDLE/Inactive Indication |
| 3 | PWS Notification Indication |
| 4-8 | Not Used, and may be ignored by UE |

When a UE receives a DCI with a CRC scrambled by a P-RNTI, the UE may check the Short Message Indicator. If the short message indicator indicates that this is a special DCI carrying a short message, the UE may check information in the corresponding short message. In this implementation, the short message may include one bit for the "SI Modification Indication" and one bit for the "Required for IDLE/Inactive Indication." If the bit representing the "SI Modification Indication" is not set (e.g., 0), the UE may know that the paging is not for informing the UE of an SI Modification. If the bit representing "SI Modification Indication" is set (e.g., 1), the UE may know that the paging is for informing the UE of an SI Modification. Then the UE may further check the information bit "Required for IDLE/Inactive Indicator". If the "Required for IDLE/Inactive Indicator" is not set (e.g. 0), both Connected UE and IDLE/Inactive UE may perform the SI acquisition procedure to acquire the updated SIB(s). If the "Required for IDLE/Inactive Indicator" is set (e.g. 1), only IDLE/Inactive UE may perform the SI acquisition procedure to acquire the updated SIB(s).

Case 1-5: In some aspects of the present embodiments, the bits for SI Modification Indication and PWS Notification Indication may be integrated. For example, if the integrated bit is "0", the UE may know that the paging is for informing the UE of an SI Modification. On the contrary, if the integrated bit is "1", the UE may know that the paging is for informing the UE of a PWS information broadcasting. An example of Case 1-5 is shown below in Table 6.

TABLE 6

Short Message Information Example for Case 1-5

| Bit | Information Description |
|---|---|
| 1 | For SI Modification Indication or for PWS Notification Indication<br>0: the paging is for indicating the SI Modification<br>1: the paging is for indicating the PWS broadcasting |
| 2 | Required for IDLE/Inactive Indication |
| 3-8 | Not Used, and may be ignored by UE |

In one implementation, one or more information bits may be used for indicating which SIB(s) or SI message(s) may be changed at the next modification period boundary. For example, in some implementations, 4 information bits may be used to indicate which SI messages (from SI message #1 to SI message #4) may be changed at the next modification period boundary.

Some of the present embodiments may use an efficient SI Modification and Acquisition procedure considering BWP configurations. Three different scenarios are given below to illustrate different possible locations of the current active BWP configured for a Connected UE. It should be noted that the NW may configure a cell-defining Synchronization Signal Block (SSB) for a UE to measure the associated cell's quality. The cell-defining SSB may be an SSB containing the MIB. The UE may use the configured measurement gap to measure the cell-defining SSB, which may imply that the UE may read the required SIB(s) or SI message(s) during the period of configured measurement gap when the UE measures the cell-defining SSB.

Scenario 1: The current active BWP configured for a Connected UE is the same as the initial active BWP, or the BWP with an SSB containing the MIB broadcasted on the Physical Broadcast Channel (PBCH), or an SSB containing the MIB broadcasted on the PBCH. In such a scenario, in some of the present embodiments, the UE may check the Short Message Indicator when the UE receives a DCI with a CRC scrambled by a P-RNTI. If the short message indicator indicates that this is a special DCI carrying a short message, the UE may determine whether to perform the SI acquisition procedure on the current active BWP (e.g., based on the information in the short message as discussed above in Cases 1-1, 1-2, 1-3, 1-4, and 1-5).

Figure 2:
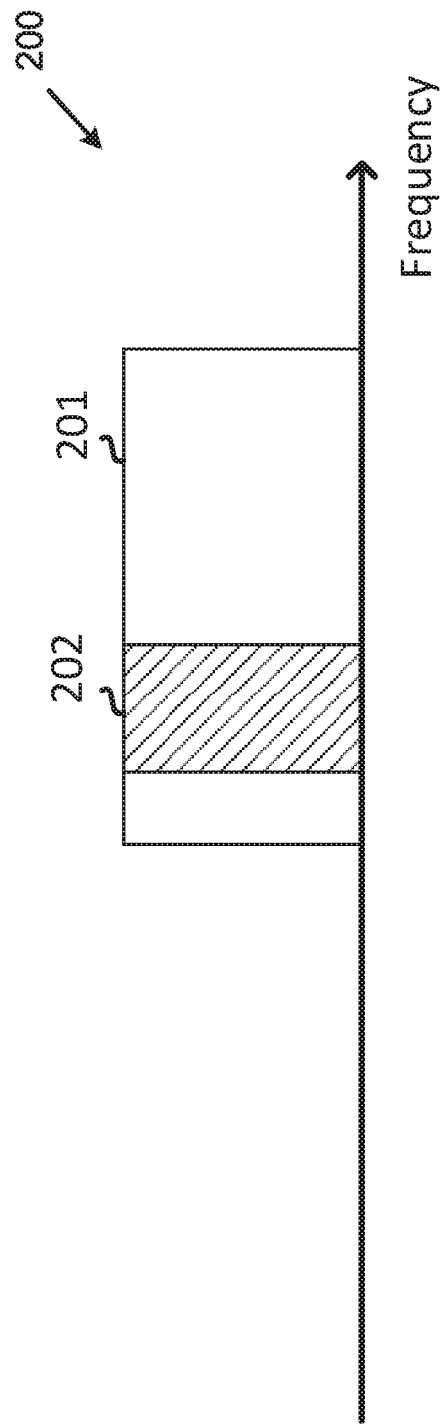
FIG. 2 shows an example spectrum illustrating that the current active BWP overlaps with an SSB containing an MIB broadcasted on a PBCH, according to an example implementation of the present application.

Scenario 2: The current active BWP configured for a Connected UE is a BWP which overlaps with the initial active BWP, or the BWP with an SSB containing the MIB broadcasted on the PBCH, or an SSB containing the MIB broadcasted on the PBCH. FIG. 2 shows an example spectrum 200 showing that the current active BWP 201 overlaps with an SSB 202 containing the MIB broadcasted on the PBCH. In such a scenario, in some of the present embodiments, the UE may check the Short Message Indicator when the UE receives a DCI with a CRC scrambled by a P-RNTI. If the short message indicator indicates that this is a special DCI carrying a short message, the UE may determine whether to perform the SI acquisition procedure on the current active BWP (e.g., based on the information in the Short message as discussed above with reference to Cases 1-1, 1-2, 1-3, 1-4, and 1-5) by reading the MIB contained in the SSB 202 (which overlaps with the current active BWP 201) and then receive the SIB1 and the other SIB(s) accordingly.

Figure 3:
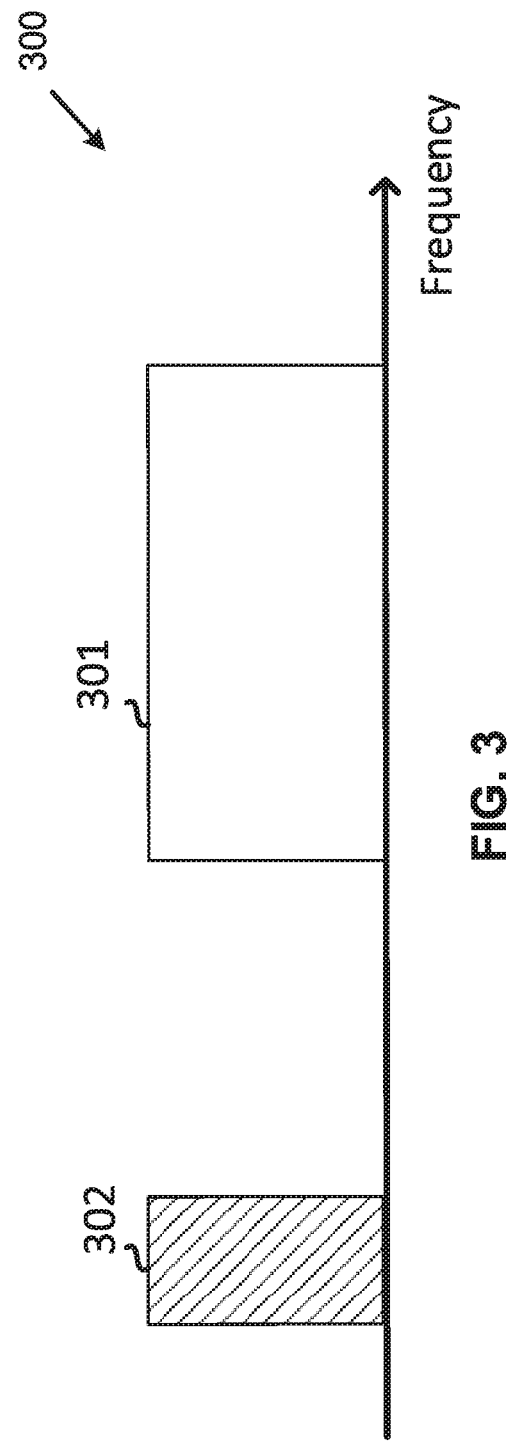
FIG. 3 shows an example spectrum illustrating that the current active BWP does not overlap with an SSB containing an MIB broadcasted on a PBCH, according to an example implementation of the present application.

Scenario 3: The current active BWP configured for a Connected UE is a BWP which does not overlap with the initial active BWP, or the BWP with an SSB containing the MIB broadcasted on the PBCH, or an SSB containing the MIB broadcasted on the PBCH. FIG. 3 shows an example spectrum 300 showing that the current active BWP 301 does not overlap with an SSB 302 containing the MIB broadcasted on the PBCH. In such a scenario, in some of the present embodiments, the NW may temporally broadcast the SI (including the MIB, the SIB1, or the OSIs) on the UE's active BWP if those SIs are not broadcasted before. It should be noted that the NW may guarantee that it broadcasts the SIB(s) at least once before the end of the next SI modification period (or a predefined time). In some aspects of the present embodiments, the UE may be assumed to be able to receive the broadcasted SIB(s) after receiving the indication in the upcoming SI modification period (or after a predefined time). It may depend on the NW implementation regarding the timing when the NW stops broadcasting the temporally broadcasted SI. For example, the NW may stop broadcasting the temporally broadcasted SI after the next X modification period(s), wherein X may be decided by the NW itself. Alternatively, the NW may ask the UE to receive the MIB, the SIB1, or the other SIs on the initial active BWP, or the BWP with an SSB containing the MIB broadcasted on the PBCH, or an SSB containing the MIB broadcasted on the PBCH. For example, the NW may ask the UE to read the MIB, the SIB1, or the other SIs on the initial active BWP, or the BWP with an SSB containing the MIB broadcasted on the PBCH, or an SSB containing the MIB broadcasted on the PBCH during the configured measurement gaps. Whether or not the NW may temporally broadcast the SI (including the MIB, the SIB1, or the OSIs) on the UE's active BWP may depend on the numerology used on the UE's current active BWP and the numerology used for the PBCH, which may be defined per carrier. For some emergency SI modifications, such as the ETWS or the CMAS, temporally broadcasting the SIB(s) on the UE's current active BWP may be faster since the UE does not need to wait for the measurement gaps. Therefore, it may be the NW's decision whether to temporally broadcast the SIB(s) on the UE's active BWP, or let the UE receive the SIB(s) on the initial active BWP, or the BWP with an SSB containing the MIB broadcasted on the PBCH, or an SSB containing the MIB broadcasted on the PBCH during the configured measurement gaps. It should be noted that the NW may configure a cell-defining SSB for a UE to measure the associated cell's quality. The cell-defining SSB may be an SSB containing the MIB.

Therefore, it may be beneficial to provide the BWP related information also in the short message to let the UE know how to perform the SI acquisition procedure. In the following different implementations, a short message may include a field (the number of bits in the field may vary in different implementations) that indicates in which BWP the UE may read the MIB.

Case 2-1: In some aspects of the present embodiments, the short message may include information bit(s) to indicate whether the SIB(s) is temporally broadcasted on the BWP or the UE needs to receive the MIB on a cell-defining SSB. The information bits in the short message, in some of the present embodiments, may include two information bits, one for indicating that the SIB(s) is "temporally broadcasted," and the other for indicating that the SIB(s) is "broadcasted on a Cell-defining SSB"

An example of Case 2-1 is shown in Table 7 below. Bit 1 in Table 7 is the SI modification bit. When a UE receives a DCI with a CRC scrambled by a P-RNTI, the UE may check the Short Message Indicator. If the short message indicator indicates that this is a special DCI carrying a short message, the UE may check the information in the corresponding short message. If the bit representing "temporally broadcasted" is set to a particular value (e.g. 1) to inform the UE that the SIB(s) may be temporally broadcasted on this BWP, the UE may perform the SI acquisition procedure to acquire the updated SIB(s) on the current active BWP. If the bit representing "broadcasted on Cell-defining SSB" is set to a value (e.g. 1) to inform the UE that it needs to receive the MIB on a cell-defining SSB, the UE may perform the SI acquisition procedure to acquire the updated SIB(s) by reading the MIB on the cell-defining SSB. Based on the content of the MIB, the UE may read the SIB1 and then the OSIs, accordingly. The UE may perform the SI acquisition procedure to acquire the updated SIB(s) by reading the MIB on the cell-defining SSB during the configured measurement gaps.

TABLE 7

Short Message Information Example for Case 2-1

| Bit | Information Description |
| --- | --- |
| 1 | SI Modification Indication |
| 2 | Temporally broadcasted |
| 3 | Broadcasted on Cell-defining SSB |
| 4 | PWS Notification Indication |
| 5-8 | Not Used, and may be ignored by UE |

Case 2-2: In some aspects of the present embodiments, the bits for "temporally broadcasted" and "broadcasted on Cell-defining SSB" may be integrated. For example, if the integrated bit is "0", the UE knows that the SIB(s) may be temporally broadcasted on this BWP. On the contrary, if the integrated bit is "1", the UE knows that it may perform the SI acquisition procedure to acquire the updated SIB(s) by reading the MIB on the cell-defining SSB. An example of Case 2-2 is shown below in Table 8. Bit 1 in Table 8 is the SI modification bit.

TABLE 8

Short Message Information Example for Case 2-2

| Bit | Information Description |
| --- | --- |
| 1 | SI Modification Indication |
| 2 | Indicate where to read MIB |
| | 0: Temporally broadcasted on the current BWP |
| | 1: Broadcasted on Cell-defining SSB |
| 3 | PWS Notification Indication |
| 4-8 | Not Used, and may be ignored by UE |

Case 2-3: In some aspects of the present embodiments, the short message may include information bit(s) to indicate whether the SIB(s) is temporally broadcasted on this BWP or the UE needs to receive the MIB on an indicated SSB. In Case 2-3, there are two information bits, one for indicating "temporally broadcasted" and the other for indicating "broadcasted on Indicated SSB".

If the bit representing "broadcasted on Indicated SSB" is set (e.g. the bit's value is set to 1) to inform the UE that it needs to receive the MIB on an indicated SSB, the UE may perform the SI acquisition procedure to acquire the updated SIB(s) by reading the MIB on the indicated SSB. The indicated SSB may be an SSB in the initial active BWP, or an SSB that is preconfigured by the NW, or indicated in the short message (e.g., in one implementation, there are additional information bit(s) in the short message to indicate the BWP's ID for the UE to receive the updated SIB(s) on where the BWP ID is configured by RRC signaling previously). An example of Case 2-3 is shown below in Table 9. Bit 1 in Table 9 is the SI modification bit.

TABLE 9

Short Message Information Example for Case 2-3

| Bit | Information Description |
| --- | --- |
| 1 | SI Modification Indication |
| 2 | Temporally broadcasted |
| 3 | Broadcasted on Indicated SSB |
| 4-5 | BWP ID for Indicated SSB |
| 6 | PWS Notification Indication |
| 7-8 | Not Used, and may be ignored by UE |

Case 2-4: In some aspects of the present embodiments, the bits for "temporally broadcasted" and "broadcasted on Indicated SSB" may be integrated. For example, if the integrated bit is "0", the UE knows that the SIB(s) may be temporally broadcasted on this BWP. On the contrary, if the integrated bit is "1", the UE knows that it may perform the SI acquisition procedure to acquire the updated SIB(s) by reading the MIB on the indicated SSB. An example of Case 2-4 is shown in Table 10 below. Bit 1 in Table 10 is the SI modification bit.

TABLE 10

Short Message Information Example for Case 2-4

| Bit | Information Description |
| --- | --- |
| 1 | For SI Modification Indication |
| 2 | Temporally broadcasted or Broadcasted on Indicated SSB |
| | 0: Temporally broadcasted |
| | 1: Broadcasted on Indicated SSB |
| 3-4 | BWP ID for Indicated SSB |
| 5 | PWS Notification Indication |
| 6-8 | Not Used, and may be ignored by UE |

Case 3: Some other aspects of the present embodiments may consider the BWP inactivity timer expiation as described below.

In a BWP switch operation, there may be a BWP inactivity timer configured for the UE. The BWP inactivity timer may start when the UE is switched to a BWP which is not the default BWP (if configured by NW) or the initial DL BWP (if the default BWP is not configured by the NW). The BWP inactivity timer may be restarted each time the UE receives downlink assignments or uplink assignments. If the BWP inactivity timer of a UE expires, the UE may autonomously switch to the default BWP (if configured) or the initial DL BWP (if the default BWP is not configured) from the current BWP for the sake of power saving.

It is possible that the BWP inactivity timer expires when the UE receives a DCI on the paging search space on the current active BWP (e.g., the NW may configure inappropriate inactivity timer that is shorter than the SI modification period), and thus the UE may switch to the default BWP or the initial DL BWP.

Scenario 1: The current BWP temporarily broadcasts updated SIB(s) or regularly broadcasts the SIB(s). The default BWP may not temporarily broadcast the updated SIB(s) or may not regularly broadcast the SIB(s). In one implementation, the UE may stop the BWP inactivity timer when performing the SI acquisition procedure, so that the SI acquisition procedure may not be interrupted by the BWP switching when the UE receives a DCI with a CRC scrambled by a P-RNTI on the current active BWP. For example, the UE may stop the BWP inactivity timer if the SI modification bit is set in the short message. The UE may start or restart the BWP inactivity timer at the end of the next modification period. Since the NW knows the paging for the SI modification notification, the NW is aware of the UE's behavior.

Scenario 2: The current active BWP temporarily broadcasts updated SIB(s) or regularly broadcasts the SIB(s). The content of the broadcasted MIB and/or SIB1 (e.g., the control resource set for SIB1 and/or OSI) on the current active BWP is the same as the content of the broadcasted MIB and/or SIB1 on the default BWP or the initial DL BWP. If the SI modification period is configured per cell, the UE may not need to stop the BWP inactivity timer. The UE may refer to the content of the broadcasted MIB and/or SIB1 on the active BWP to receive the updated SIB(s) on the default BWP or the initial DL BWP when the BWP inactivity timer expires.

Scenario 3: The content of the broadcasted MIB and/or SIB1 (e.g., the control resource set for SIB1 and/or OSI) is not the same as the content of the broadcasted MIB and/or SIB1 on the default BWP or the initial DL BWP, or the SI modification period is configured per BWP. If the BWP inactivity timer expires and the UE is switched to the default BWP or the initial DL BWP, the UE may receive the MIB or apply the stored valid MIB information and SIB1 broadcasted on the default BWP or the initial DL BWP again. Then, the UE may obtain the required SI based on the MIB and SIB1 from the default/initial DL BWP.

In one implementation, if the short message indicator indicates that the short message is present in the DCI (only the short message is present, or both the short message and the scheduling information for paging are present), the UE may check the short message (which includes an SI modification bit) in the DCI. For example, the UE may check the SI modification bit in the short message in the DCI when the short message indicator indicates that the short message is present but the scheduling information for paging is not present in the DCI.

Some implementations regarding the paging message are described below. In one implementation, the SI change indication may be included in the paging message. If the NW does not broadcast the system information for some reasons or the NW determines that transmitting the system information using other approaches (e.g., for quick update) is beneficial, a unicast way for the SI transmission may be considered. On the other hand, considering the number of Connected UEs in a cell and the resource wasting for delivering the updated SIB(s) via dedicated signaling to each Connected UE, using the Paging Message to carry the necessary information may be helpful from the NW's point of view.

FIG. 4A shows one format of the paging message, according to an example implementation of the present application. Abstract Syntax Notation One (ASN.1) is used to describe the data structure of various implementations of the paging message. As shown in FIG. 4A, the data structure 400A may include a paging record list. The paging record list may be a list of paging record. The paging record may include at least a UE ID. FIG. 4B shows another format of the paging message, according to an example implementation of the present application. As shown in FIG. 4B, the data structure 400B may further include at least one of the following: a system modification indication, an ETWS indication, and a CMAS indication.

The data structure of the paging message in the following implementations may be extended from the data structure 400A shown in FIG. 4A. In one implementation, the paging message may not include any of the following: a system modification indication, an ETWS indication, and a CMAS indication. For example, when a UE receives a DCI which is transmitted with a CRC scrambled by a P-RNTI, the UE may check the Short Message Indicator. If the short message indicator indicates that the scheduling information for paging is present in the DCI (only the scheduling information for paging is present, or both the short message and the scheduling information for paging are present), the UE may receive the paging message from the base station. The paging message may include no indication information about the SI modification. The UE may check the SI modification bit in the short message if the short message is present in the DCI.

In one implementation, the paging message may include updated system information. As such, when the UE determines, from the short message, that there is an SI modification, the UE may be able to read the updated system information from the paging message, which makes the SI update procedure faster.

FIG. 5 shows another format of the paging message, according to an example implementation of the present application. The data structure 500 may include the MIB or MIB related content (which may be used to read the SIB1).

FIG. 6 shows another format of the paging message, according to an example implementation of the present application. The data structure 600 may include the SIB1 or SIB1 related content (which may be used to receive the other SIB(s)).

FIG. 7 shows another format of the paging message, according to an example implementation of the present application. The data structure 700 may include updated SIB(s). In some embodiments, the updated SIB(s) may include neither MIB nor SIB1. In this format, the value tag of the updated SIB(s) may be also included for the UE to check the validity of the stored SIB (s).

In one implementation, UE IDs may also be included in the paging message for specific UE paging.

FIG. 8 shows another format of the paging message, according to an example implementation of the present application. In this implementation, the data structure 800 of the paging message may include a choice structure such that the paging message may include at least one of the following: the MIB, the SIB1, and an updated SIB. In some embodiments, the updated SIB(s) may include neither MIB nor SIB1. The NW may indicate whether the MIB/MIB related content, the SIB1/SIB1 related content, or the updated SIB(s) is carried in the paging message.

If the size of the MIB/MIB related content or the SIB1/SIB1 related content is acceptable, or the updated SIB(s) is not urgent, the NW may use the associated paging message formats, e.g., the format shown in FIG. 5 or the format shown in FIG. 6. On the contrary, if the total size of the updated SIB(s) is acceptable, or the updated SIB(s) is urgent, the NW may use the associated paging message format, e.g., the format shown in FIG. 7.

In some other implementations, other information may also be carried in the paging message, including:
1. A Required for Connected UE field: to indicate whether the SI modification is required for a Connected UE.
2. A Required for IDLE/Connected UE field: to indicate whether the SI modification is required for an IDLE/Inactive UE.
3. A PWS Notification Indication field: to indicate the PWS information are broadcasted. Alternatively, there may be one indication for the ETWS notification and one indication for the CMAS notification.
4. A Temporally broadcasted field: to indicate the SIB(s) may be temporally broadcasted on the UE's current active BWP.
5. A Broadcasted on Cell-defining SSB field, or Broadcasted on Indicated SSB field: to indicate that the UE may need to receive the MIB on a Cell-defining SSB or an Indicated SSB.

In one implementation, the NW may use the RAN-based paging mechanism (which is used for paging an Inactive UE) or CN-based paging mechanism (which is used for paging both IDLE and Inactive UE) to unicast the updated SIB(s) to the specific Inactive UE or IDLE UE. Specifically, the NW may use the paging message to carry the necessary information for the SI update. There may be several implementations/formats for the paging message. For example, in one format, the paging message may include an SI Modification Indication. In another format, the paging message may include the MIB or MIB related content (which may be used to read the SIB1). In another format, the paging message may include the SIB1 or SIB1 related content (which may be used to receive the other SIB(s)). In another format, the paging message may include the updated SIB(s).

For example, if there are different required SIB(s) for different Inactive UE(s) in the same paging message, the updated SIB(s) for UE #1 may be associated with the UE ID of UE #1 and the updated SIB(s) for UE #2 may be associated with the UE ID of UE #2. Different formats for different UEs or UE group(s) may be allowed in the same paging message.

FIG. 9 shows another format of the paging message, according to an example implementation of the present application. In this implementation, the data structure 900 of the paging message may include information to indicate which SIB(s) or SI message(s) may change at the next modification period boundary. For example, if the format described with reference to FIG. 5 is adopted, the updated SI Message (UpdatedSlMessage) may be a list to indicate which SI message is to be updated. The SI-MessageID is the identity for each SI message and the maxSI-Message is the maximum number of the SI messages that may be configured for the NW. In another implementation, there may be Updated SIB (UpdatedSIB), which is a list to indicate which SIB may be updated.

In one implementation, the information bit representing the "SI Modification Indication" may only be carried in the short message and no information bit representing "SI Modification Indication" may be carried in the paging Message. That is, the Paging Message may only be used for specific User Paging (by including the UE ID(s)). For the updated SIB(s), the NW may use dedicated signaling to deliver the updated SIB(s) to the Connected UE(s).

There may be several implementations/formats in dedicated signaling for SI modification. For example, in one implementation (also referred to as the first format), the dedicated signaling may include the MIB or MIB related content (which may be used to read the SIB1). In another implementation (also referred to as the second format), the dedicated signaling may include the SIB1 or SIB1 related content (which may be used to receive the other SIB(s)). In another implementation (also referred to as the third format), the dedicated signaling may include the Updated SIB(s).

There may be a choice structure to decide whether the MIB/MIB related content, the SIB1/SIB1 related content, or the updated SIB(s) is carried in dedicated signaling for the SI modification. The NW may make the decision based on the size of the updated SIB(s). If the total size of the updated SIB(s) is large or the number of Connected UE(s) is large, the NW may transmit dedicated signaling for the SI modification with the first format or the second format. Otherwise, the NW may transmit dedicated signaling for SI modification with the third format.

In one implementation, the short message format received on the initial active BWP (for both Connected UE and IDLE/Inactive UE) and the short message format received on configured BWP(s) (for Connected UE) may be different. For example, for the short message format received on the initial active BWP, the information bits for "temporally broadcasted" and "broadcasted on cell-defining SSB" may not be required since both Connected UE and IDLE/Connected UE may read the broadcasted MIB on the initial active BWP. On the other hand, for the short message format received on the other configured BWP(s), the information bits for "Required for Connected UE" and "Required for IDLE/Connected UE" may not be required since the configured BWP(s) are only applied to the Connected UE. In such implementations, the size of the short message may be the same, but the information bits carried in the short message may be different. For example, if the size of the short message is fixed to 4 bits, then in the short message format received on the initial active BWP, there may be 4 information bits for "SI Modification Indication", "Required for Connected UE", "Required for IDLE/Connected UE", and "PWS Notification Indication". In the short message format received on a configured BWP(s), there may be 4 information bits for "SI Modification Indication", "PWS Notification Indication," "temporally broadcasted" and "broadcasted on Cell-defining SSB".

Figure 10:
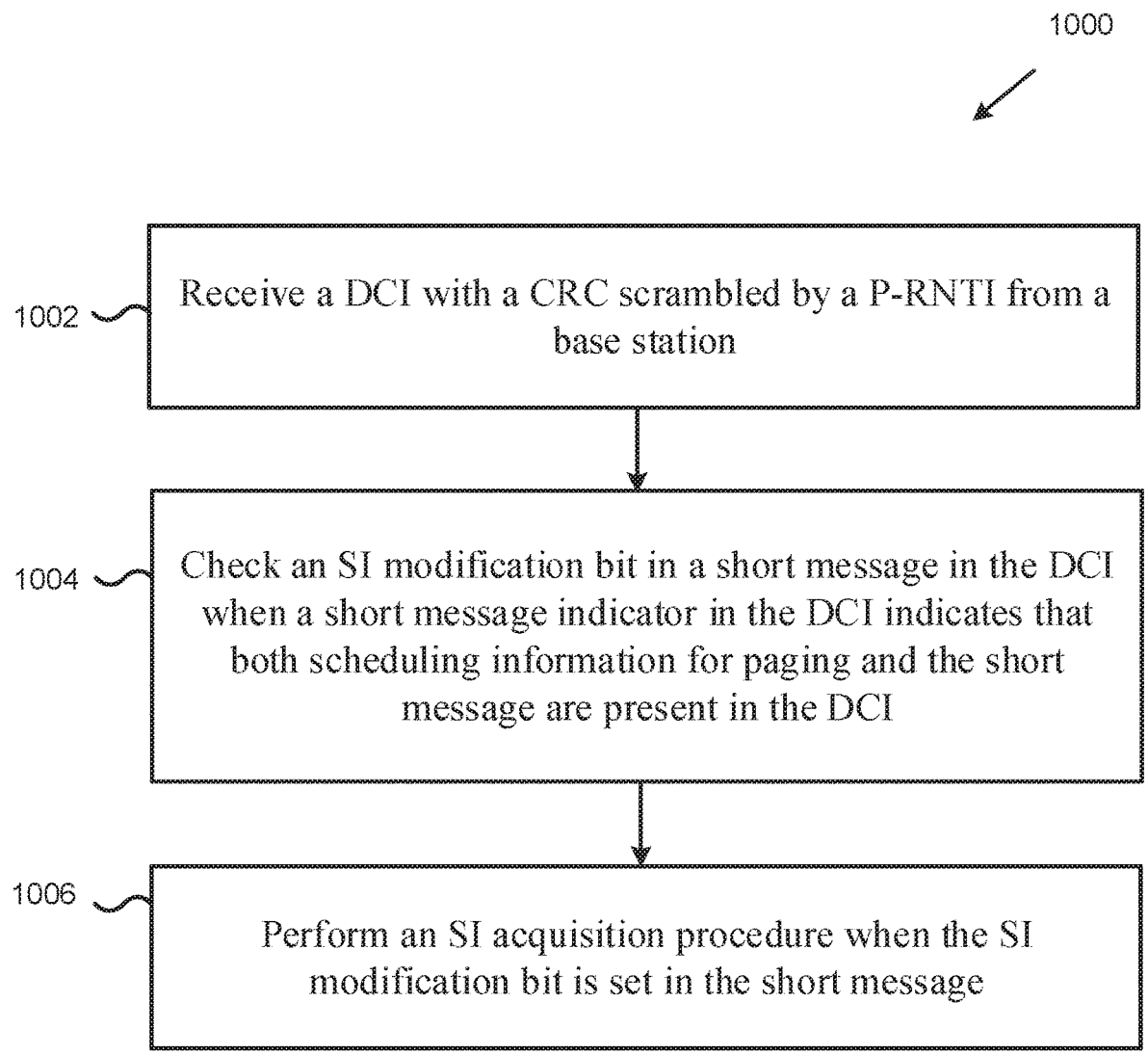
FIG. 10 shows a flowchart of the method of wireless communications performed by UE, according to an example implementation of the present application.

FIG. 10 shows a flowchart for a method of wireless communications performed by a UE, according to an example implementation of the present application. The method 1000 includes actions 1002, 1004, and 1006.

In action 1002, the UE may receive a DCI with a CRC scrambled by a P-RNTI from a base station. For example, the UE may receive the DCI on the paging search space.

In action 1004, the UE may check an SI modification bit in a short message in the DCI when a short message indicator in the DCI indicates that both scheduling information for paging and the short message are present in the DCI. The short message indicator may indicate whether the scheduling information for paging is present in the DCI and whether the short message is present in the DCI.

In action 1006, the UE may perform an SI acquisition procedure when the SI modification bit is set in the short message.

Figure 11:
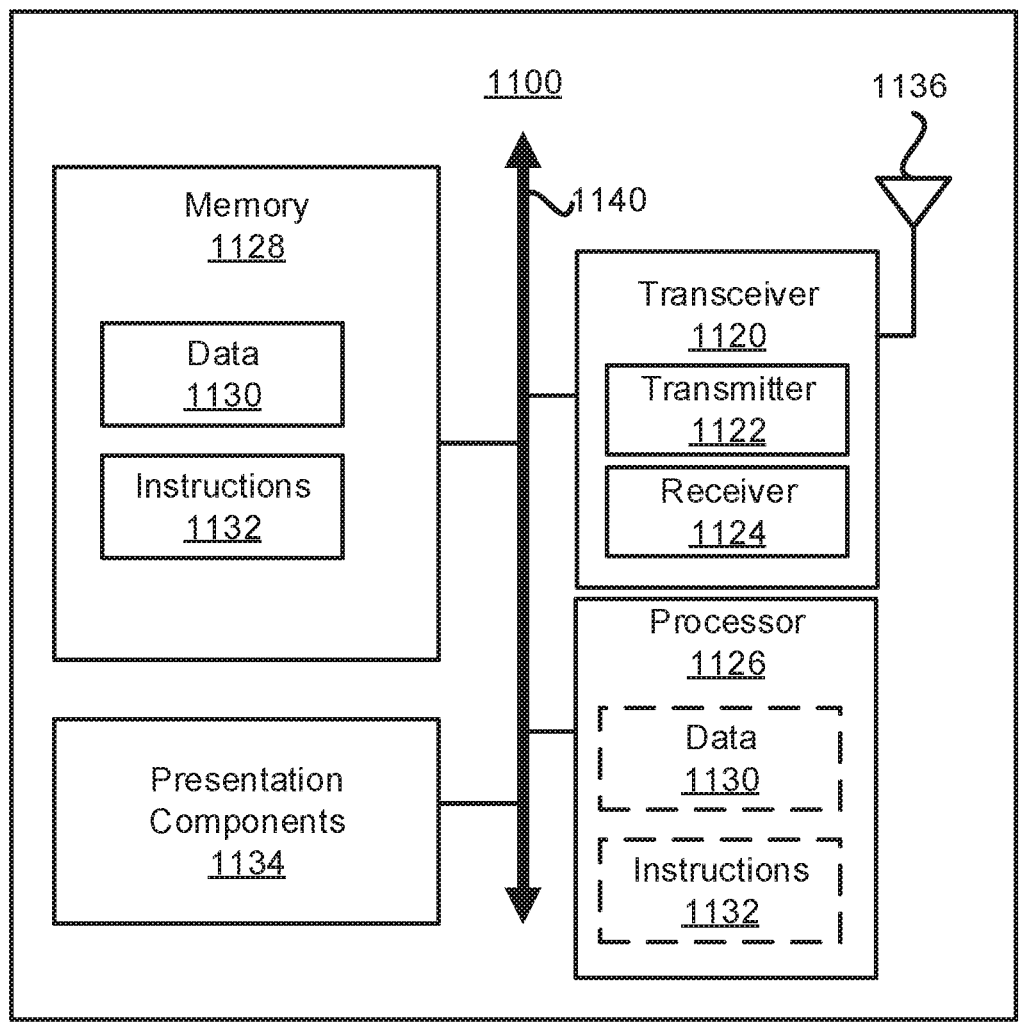
FIG. 11 shows a block diagram of a node for wireless communication, in accordance with various aspects of the present application.

FIG. 11 shows a block diagram of a node for wireless communication, in accordance with various aspects of the present application. As shown in FIG. 11, node 1100 may include transceiver 1120, processor 1126, memory 1128, one or more presentation components 1134, and at least one antenna 1136. Node 1100 may also include a Radio Frequency (RF) spectrum band module, a base station communications module, a network communications module, and a system communications management module, input/output (I/O) ports, I/O components, and power supply (not explicitly shown in FIG. 11). Each of these components may be in communication with each other, directly or indirectly, over one or more buses 1140.

Transceiver 1120 having transmitter 1122 and receiver 1124 may be configured to transmit and/or receive time and/or frequency resource partitioning information. In some implementations, transceiver 1120 may be configured to transmit in different types of subframes and slots including, but not limited to, usable, non-usable and flexibly usable subframes and slot formats. Transceiver 1120 may be configured to receive data and control channels.

Node 1100 may include a variety of computer-readable media. Computer-readable media can be any available media that can be accessed by node 1100 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1128 may include computer-storage media in the form of volatile and/or non-volatile memory. Memory 1128 may be removable, non-removable, or a combination thereof. Exemplary memory includes solid-state memory, hard drives, optical-disc drives, and etc. As illustrated in FIG. 11, memory 1128 may store computer-readable, computer-executable instructions 1132 (e.g., software codes) that are configured to, when executed, cause processor 1126 to perform various functions described herein, for example, with reference to FIGS. 1 through 10. Alternatively, instructions 1132 may not be directly executable by processor 1126 but be configured to cause node 1100 (e.g., when compiled and executed) to perform various functions described herein.

Processor 1126 may include an intelligent hardware device, e.g., a central processing unit (CPU), a microcontroller, an ASIC, and etc. Processor 1126 may include memory. Processor 1126 may process data 1130 and instructions 1132 received from memory 1128, and information through transceiver 1120, the base band communications module, and/or the network communications module. Processor 1126 may also process information to be sent to transceiver 1120 for transmission through antenna 1136, to the network communications module for transmission to a core network.

One or more presentation components 1134 presents data indications to a person or other device. Exemplary one or more presentation components 1134 include a display device, speaker, printing component, vibrating component, and etc.

From the above description, it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method of wireless communications performed by a user equipment (UE), the method comprising:
   receiving a downlink control information (DCI) with a cyclic redundancy check (CRC) scrambled by a paging radio network temporary identifier (P-RNTI) from a base station;
   checking a system information (SI) modification bit in a short message in the DCI after determining that a short message indicator in the DCI indicates that both scheduling information for paging and the short message are present in the DCI; and
   performing an SI acquisition procedure after determining that the SI modification bit is set in the short message.

2. The method of claim 1, wherein the short message comprises one public warning system (PWS) notification bit for both earthquake and tsunami warning system (ETWS) notification and commercial mobile alert system (CMAS) notification.

3. The method of claim 1, further comprising:
   receiving a paging message from the base station after determining that the short message indicator indicates that the scheduling information for paging is present in the DCI, wherein the paging message comprises no indication information about an SI modification.

4. The method of claim 3, wherein the paging message comprises updated system information.

5. The method of claim 3, wherein the paging message comprises at least one of the following: a master information block (MIB), a system information block type 1 (SIB1), an updated SIB, an updated SIB Identifier (ID), and an updated SI message ID.

6. The method of claim 1, wherein the short message further comprises a field indicating whether the UE in different radio resource control (RRC) states performs the SI acquisition procedure.

7. The method of claim 1, wherein a value of the P-RNTI is preconfigured for a radio resource control (RRC) state.

8. The method of claim 1, wherein the short message further comprises a field indicating in which bandwidth part (BWP) the UE reads a master information block (MIB).

9. The method of claim 1, further comprising:
checking the SI modification bit in the short message in the DCI after determining that the short message indicator in the DCI indicates that the short message is present but the scheduling information for paging is not present in the DCI.

10. The method of claim 1, further comprising:
stopping a bandwidth part (BWP) inactivity timer of the UE after determining that the SI modification bit is set in the short message.

11. The UE of claim 1, wherein the at least one processor is further configured to execute the computer-executable instructions to:
check the SI modification bit in the short message in the DCI after determining that the short message indicator in the DCI indicates that the short message is present but the scheduling information for paging is not present in the DCI.

12. A user equipment (UE), comprising:
one or more non-transitory computer-readable media having computer-executable instructions embodied thereon; and
at least one processor coupled to the one or more non-transitory computer-readable media, and configured to execute the computer-executable instructions to:
receive a downlink control information (DCI) with a cyclic redundancy check (CRC) scrambled by a paging radio network temporary identifier (P-RNTI) from a base station;
check a system information (SI) modification bit in a short message in the DCI after determining that a short message indicator in the DCI indicates that both scheduling information for paging and the short message are present in the DCI; and
perform an SI acquisition procedure after determining that the SI modification bit is set in the short message.

13. The UE of claim 12, wherein the at least one processor is further configured to execute the computer-executable instructions to:
receive a paging message from the base station after determining that the short message indicator indicates that the scheduling information for paging is present in the DCI, wherein the paging message comprises no indication information about an SI modification.

14. The UE of claim 13, wherein the paging message comprises updated system information.

15. The UE of claim 13, wherein the paging message comprises at least one of the following: a master information block (MIB), a system information block type 1 (SIB1), an updated SIB, an updated SIB Identifier (ID), and an updated SI message ID.

16. The UE of claim 12, wherein the short message further comprises a field indicating whether the UE in different radio resource control (RRC) states performs the SI acquisition procedure.

17. The UE of claim 12, wherein a value of the P-RNTI is preconfigured for a radio resource control (RRC) state.

18. The UE of claim 12, wherein the short message further comprises a field indicating in which bandwidth part (BWP) the UE reads a master information block (MIB).

19. The UE of claim 12, wherein the short message comprises one public warning system (PWS) notification bit for both earthquake and tsunami warning system (ETWS) notification and commercial mobile alert system (CMAS) notification.

20. The UE of claim 12, wherein the at least one processor is further configured to execute the computer-executable instructions to:
stop a bandwidth part (BWP) inactivity timer of the UE after determining that the SI modification bit is set in the short message.

* * * * *